US010153952B2

(12) United States Patent
Wang et al.

(10) Patent No.: US 10,153,952 B2
(45) Date of Patent: Dec. 11, 2018

(54) NETWORK TRAFFIC MONITORING SYSTEM AND METHOD THEREOF

(71) Applicant: INDUSTRIAL TECHNOLOGY RESEARCH INSTITUTE, Hsinchu (TW)

(72) Inventors: Wei-Cheng Wang, Taichung (TW); Ming-Hung Hsu, Hsinchu County (TW); Chien-Chao Tseng, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 69 days.

(21) Appl. No.: 15/385,733

(22) Filed: Dec. 20, 2016

(65) Prior Publication Data
US 2018/0145891 A1 May 24, 2018

(30) Foreign Application Priority Data

Nov. 18, 2016 (TW) .............................. 105137974 A

(51) Int. Cl.
*H04L 12/26* (2006.01)
*H04L 12/851* (2013.01)
*H04L 29/06* (2006.01)
(52) U.S. Cl.
CPC .......... *H04L 43/024* (2013.01); *H04L 43/026* (2013.01); *H04L 43/0888* (2013.01); *H04L 43/14* (2013.01); *H04L 47/2441* (2013.01); *H04L 69/22* (2013.01)

(58) Field of Classification Search
None
See application file for complete search history.

(56) References Cited

U.S. PATENT DOCUMENTS

| 7,536,455 | B2 | 5/2009 | Duffield et al. | |
|---|---|---|---|---|
| 7,911,975 | B2 * | 3/2011 | Droz .................... | H04L 43/024 370/252 |
| 8,593,958 | B2 * | 11/2013 | Zhang ................... | H04L 43/026 370/230.1 |

(Continued)

FOREIGN PATENT DOCUMENTS

| CN | 102752123 A | 10/2012 |
|---|---|---|
| CN | 103314557 A | 9/2013 |

(Continued)

OTHER PUBLICATIONS

Phaal et al., "InMon Corporation's sFlow: A Method for Monitoring Traffic in Switched and Routed Networks", <http://WWW.ietf.org/rfc/rfc3176.txt>, Sep. 2001.*

(Continued)

*Primary Examiner* — Alpus Hsu
(74) *Attorney, Agent, or Firm* — Maschoff Brennan

(57) ABSTRACT

A network traffic monitoring method includes: collecting sampled packet data of a switch wherein the sampled packet data relates to a plurality of types of packets, selecting a first type of packets from the plurality of types of packets, controlling the switch to collect traffic data of the first type of packets, and estimating a traffic volume of each of the plurality of types of packets according to the traffic data and the sampled packet data.

17 Claims, 12 Drawing Sheets

(56) References Cited

U.S. PATENT DOCUMENTS

| | | | | |
|---|---|---|---|---|
| 8,792,347 | B2* | 7/2014 | Swenson | H04L 47/11 370/232 |
| 8,989,010 | B2* | 3/2015 | Beheshti-Zavareh | H04L 47/283 370/236 |
| 9,191,331 | B2* | 11/2015 | Beheshti-Zavareh | H04L 47/283 |
| 9,203,711 | B2 | 12/2015 | Agarwal et al. | |
| 9,331,944 | B2* | 5/2016 | Swenson | H04L 47/11 |
| 9,401,853 | B2 | 7/2016 | Agarwal et al. | |
| 9,426,072 | B2* | 8/2016 | Ratzin | H04L 47/11 |
| 9,813,323 | B2* | 11/2017 | Emmadi | H04L 43/12 |
| 2007/0121509 | A1* | 5/2007 | Taylor | H04L 41/147 370/235 |
| 2013/0304915 | A1 | 11/2013 | Kawai | |
| 2015/0085694 | A1 | 3/2015 | Agarwal et al. | |
| 2015/0113132 | A1* | 4/2015 | Srinivas | H04L 41/0816 709/224 |
| 2015/0222491 | A1* | 8/2015 | Clark | H04L 45/48 370/256 |
| 2016/0050132 | A1* | 2/2016 | Zhang | H04L 29/08153 370/252 |

FOREIGN PATENT DOCUMENTS

| | | |
|---|---|---|
| CN | 103747477 A | 4/2014 |
| CN | 104579810 A | 4/2015 |
| CN | 104580173 A | 4/2015 |
| CN | 105791157 A | 7/2016 |
| EP | 1 603 274 A1 | 12/2005 |
| TW | 200926674 A | 6/2009 |
| TW | 201605208 A | 2/2016 |

OTHER PUBLICATIONS

Chun-Yu Lin, et al. "Elephant flow detection in datacenters using openflow-based hierarchical statistics pulling." 2014 IEEE Global Communications Conference. IEEE, 2014. (2014).

Van Adrichem, Niels LM, Christian Doerr, and Fernando A. Kuipers. "Opennetmon: Network monitoring in openflow software-defined networks." 2014 IEEE Network Operations and Management Symposium (NOMS). IEEE, 2014. (2014).

Junho Suh, et al. "OpenSample: A low-latency, sampling-based measurement platform for commodity SDN." Distributed Computing Systems (ICDCS), 2014 IEEE 34th International Conference on. IEEE, 2014. (2014).

Ian F. Akyildiz, et al. "Research challenges for traffic engineering in software defined networks." IEEE Network 30.3 (2016): 52-58.

Diego Kreutz, et al. "Software-defined networking: A comprehensive survey." Proceedings of the IEEE 103.1 (2015): 14-76.

Henrique Rodrigues, et al. "Traffic optimization in multi-layered WANs using SDN." 2014 IEEE 22nd Annual Symposium on High-Performance Interconnects. IEEE, 2014. (2014).

Taiwanese Search Report for corresponding application No. 105137974, dated Mar. 30, 2018 (partial translation).

* cited by examiner

NETWORK TRAFFIC MONITORING SYSTEM AND METHOD THEREOF

CROSS-REFERENCE TO RELATED APPLICATIONS

This non-provisional application claims priority under 35 U.S.C. § 119(a) on Patent Application No(s). 105137974 filed in Taiwan, R.O.C. on Nov. 18, 2016, the entire contents of which are hereby incorporated by reference.

TECHNICAL FIELD

This disclosure relates to a network traffic monitoring system and method thereof.

BACKGROUND

Nowadays, network communication is necessary for modern people. Hundreds and thousands of people are involved in the various services provided by the network. However, because the bandwidth of the network has a limitation, monitoring network traffic volume of each kind of the service is required for distributing the traffic to each kind of the service in the limited bandwidth situation. Furthermore, in some situations, the traffic volume of an individual user needs to be limited so the network traffic volume of each user also may need to be monitored.

SUMMARY

According to one or more embodiments of this disclosure, a network traffic monitoring method includes: collecting sampled packet data of a switch, wherein the sampled packet data relates to a plurality of types of packets; selecting a first type of packets from the plurality of types of packets; controlling the switch to collect traffic data of the first type of packets; and estimating a traffic volume of each of the plurality of types of packets according to the traffic data and the sampled packet data.

According to one or more embodiments of this disclosure, a network traffic monitoring system includes a sampled data collecting module, a controller, and a traffic analyzer. The sampled data collecting module is configured to collect sampled packet data of a switch, wherein the sampled packet data relates to a plurality of types of packets. The controller is configured to select a first type of packets from the plurality of types of packets, control the switch to collect traffic data of the first type of packets. The traffic analyzer is electrically connected to the controller and the sampled data collecting module and configured to estimate a traffic volume of each of the plurality of types of packets according to the traffic data and the sampled packet data.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
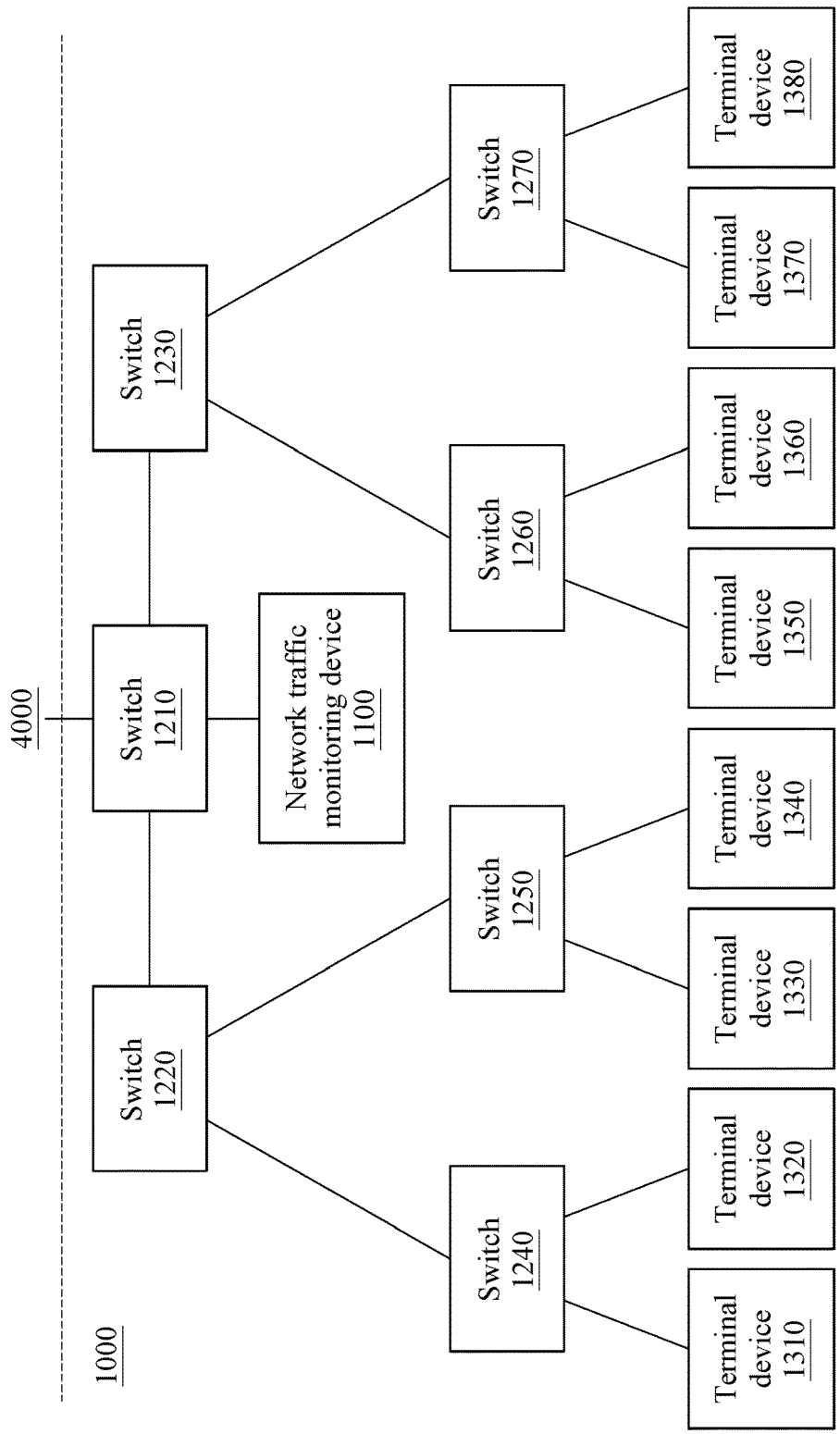
FIG. 1 is a schematic diagram of a local area network architecture in an embodiment of this disclosure.

Please refer to FIG. 1, which is a schematic diagram of a local area network architecture in an embodiment of this disclosure. As shown in FIG. 1, a local area network architecture 1000, which may be applied to the field of OpenFlow for the forwarding of packets, includes a network traffic monitoring system 1100, switches 1210-1270 and terminal devices 1310-1380. The terminal device 1310 and the terminal device 1320 directly exchange data with the switch 1240; the terminal device 1330 and the terminal device 1340 directly exchange data with the switch 1250; the terminal device 1350 and the terminal device 1360 directly exchange data with the switch 1260; and the terminal device 1370 and the terminal device 1380 directly exchange data with the switch 1270. The switch 1240 and the switch 1250 directly exchange data with the switch 1220, and the switch 1260 and the switch 1270 directly exchange data with the switch 1230. The switch 1220 and the switch 1230 directly exchange data with the switch 1210, and the switch 1210 directly exchanges data with an external network 4000. More concretely, when the terminal device 1310 transmits data to the terminal device 1380, a data packet is transmitted to the terminal device 1380 via the switch 1240, the switch 1220, the switch 1210, the switch 1230 and the switch 1270 orderly, and when the terminal device 1320 transmits data to the terminal device 1330, a data packet is transmitted to the terminal device 1330 via the switch 1240, the switch 1220, the switch 1250 orderly. In one or more embodiments of this disclosure, the switch may be a general network switch. More concretely, the switches permit the polling of a controller and use the packet sampling technology.

The network traffic monitoring system 1100 exchanges data with the switches 1210-1270. In an embodiment, the switches 1210-1270 respectively directly exchange data with the network traffic monitoring system 1100. In other words, the switches 1210-1270 are directly electrically connected to the network traffic monitoring system 1100, and the switches 1210-1270 respectively directly transmit sampled flow (sFlow) data to the network traffic monitoring system 1100, for example. In another embodiment, the network traffic monitoring system 1100 directly exchanges data with the switch 1210, and the other switches transmit the sFlow data to the network traffic monitoring system 1100 via the switch 1210. In yet another embodiment, the network traffic monitoring system 1100 only monitors one or more switches directly connected to the terminal device. In other words, only the switches 1240-1270 transmit the sFlow data to the network traffic monitoring system 1100.

Figure 2:
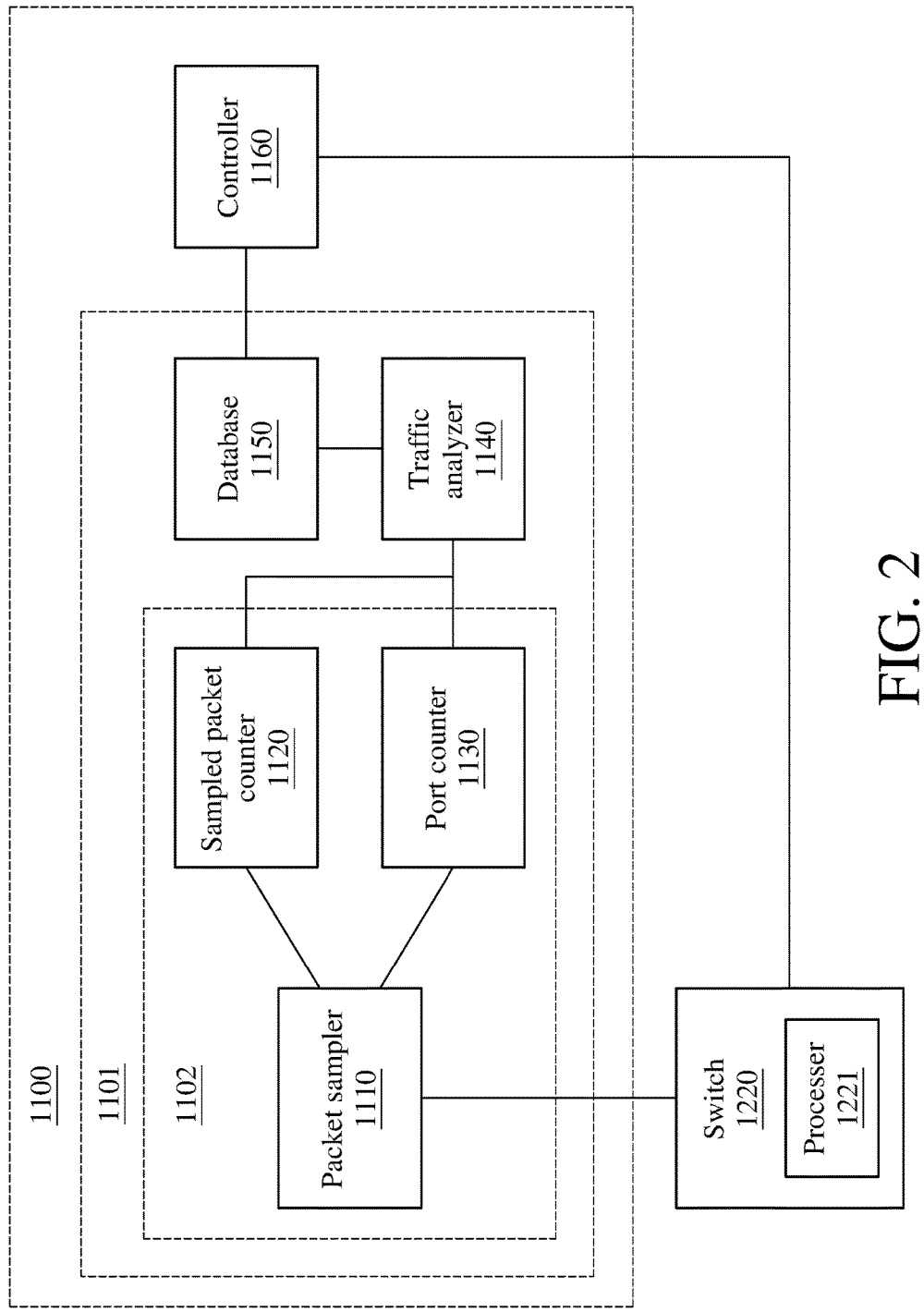
FIG. 2 is a block diagram of the network traffic monitoring system, which is shown in FIG. 1, in an embodiment of this disclosure.

Please refer to FIG. 2, which is a block diagram of the network traffic monitoring system, which is shown in FIG. 1, in an embodiment of this disclosure. As shown in FIG. 2, the network traffic monitoring system 1100 includes a packet sampler 1110 (e.g., sFlow collector), a sampled packet counter 1120 (e.g., sampled packet collector), a port counter 1130 (e.g., port collector), a traffic analyzer 1140, a database 1150 and a controller 1160, wherein the packet sampler 1110, the packet counter 1120 and the port counter 1130 can be included in a sampled data collecting module, and the database 1150 can be a storage medium or a data set stored in a storage medium. In an embodiment, the controller 1160 can be a software defined network (SDN) controller.

In an embodiment, the network traffic monitoring system 1100 may include two devices with a difference in physical structure therebetween. One is a traffic monitoring device includes the packet sampler 1110, the sampled packet counter 1120, the port counter 1130, the traffic analyzer 1140 and the database 1150; the other one is the controller 1160 that is disposed independently outside the traffic monitoring device. In another embodiment, the network traffic monitoring system 1100 may be a server including a processor and a memory, and the packet sampler 1110, the sampled packet counter 1120, the port counter 1130, the traffic analyzer 1140, the database 1150 and the controller 1160 can be software programs or hardware components of the server.

Figure 3:
FIG. 3 is a schematic diagram of packet sampling in an embodiment of this disclosure.

The packet sampler 1110 is configured to collect sampled flow (sFlow) data of a switch. More concretely, if a system administrator (user) would like to monitor the traffic of packet exchanging among the terminal devices 1310-1340, the packet sampler 1110 collects the sampled flow (sFlow) data of the switches 1220, 1240 and 1250. In another embodiment, the packet sampler 1110 merely collects the sampled flow (sFlow) data of the switches 1240 and 1250. Please refer to FIG. 3, which is a schematic diagram of packet sampling in an embodiment of this disclosure. As shown in FIG. 3, thirty-two packets pass through the switch 1220 orderly, and include A type of packets, B type of packets and C type of packets. When a sampling interval is 4, the fourth packet of every four packets is selected to be a sample. Therefore, the order of the types of samples is BCBABBBA. In other words, in these eight samples, the A type of packets accounts for a quarter of the sampled packets, the B type of packets accounts for five-eighth of the sampled packets, and the C type of packets accounts for one-eighth of the sampled packets. When a sampling interval is 8, the eighth packet of every eight packets is selected to be a sample. Therefore, the order of the types of samples is CABA. In other words, in these four sampled packets, the A type of packets accounts for half of the sampled packets, the B type of packet accounts for a quarter of the sampled packets, and the C type of packet accounts for a quarter of the sampled packets.

In an embodiment, the sampled flow (sFlow) data includes a flag of the switch, data about an input connection port, data about an output connection port, a time stamp, and so on. After the packet sampler 1110 collects the aforementioned sampled flow (sFlow) data, the sampled packet counter 1120 also obtains the aforementioned data of sFlow as sampled packet data, and the port counter 1130 obtains data about the amount of input/output packets of each of the connection ports of the switch 1220. The data obtained by the sampled packet counter 1120 and the port counter 1130 is transferred to the traffic analyzer 1140. In an embodiment, the traffic analyzer 1140 writes the data from the sampled packet counter 1120 and the port counter 1130 in the database 1150. Therefore, in an embodiment, the current sampled packet data is recorded in the database 1150. In another embodiment, one piece or more pieces of historical sampled packet data are recorded in the database 1150.

The controller 1160 is configured to select the A type, the B type, or the C type of packets as a first type of packets, and control the switch 1220 to collect traffic data of the first type of packets. In an embodiment, the traffic analyzer 1140 is configured to estimate an estimated traffic volume corresponding to each type of packets according to the sampled packet data in the database 1150. In other words, in the embodiment as shown in FIG. 3, when the sampling interval is 4 and each of the packets has the same size, the traffic volume of the A type of packets accounts for a quarter of the total traffic volume, the traffic volume of the B type of packets accounts for five-eighth of the total traffic volume, and the traffic volume of the C type of packets accounts for one-eighth of the total traffic volume, for the switch 1220. Selecting the first type of packets by the 1160 is based on the maximum of the estimated traffic volumes of the three types of packets. In other words, when the sampling interval is 4, the controller 1160 selects the B type of packets as the first type of packets. Similarly, in this embodiment, when the sampling interval is 8, the controller 1160 selects the A type of packets as the first type of packets.

In the embodiment based on the sampling interval of 4, the controller 1160 transmits a traffic control instruction (e.g., FlowMod) to the switch 1220 so that the switch 1220, according to the instruction, provides a monitoring list and an operating list. Whenever the packet received by the switch 1220 is B type, the switch 1220 schedules the packet in the monitoring list so that the switch 1220 is able to collect traffic data of the packet scheduled in the monitoring list. Then, the packet is scheduled in the operating list so that the packet is forwarded according to the operation and/or the connection port which are defined in the operation list. On the other hand, if the packet received by the switch 1220 is not B type, the switch 1220 directly schedules the packet in the operating list in order to transmit the packet according to the operation and/or the connection port defined in the operating list.

Accordingly, on one hand, the switch 1220 samples all packets passing through the switch 1220. On the other hand, whenever the switch 1220 receives a first type packet (a B type packet in this embodiment), the switch 1220 fully records the accumulated amount of the B type packets and the size of the packet or other information. Moreover, the switch 1220 transmits the data about the monitoring list to the controller 1160 periodically or according to a request from the controller 1160. Therefore, the controller 1160 is able to estimate the traffic volume of the B type of packets according to the traffic data (total traffic volume) recorded in the database 1150.

In an embodiment, the controller 1160 does not define the first type of packets based on the maximum of the traffic volumes of all types of packets, but defines it based on other conditions instead. More concretely, in various embodiments, the controller 1160 may select one or more packets, which have a source address, a target address or a service type matching a specific condition, as the first type of packets. For example, the A type packets are packets of point-to-point communication, which are transmitted from the terminal device 1310 to the terminal device 1380; the B type packets are packets of video streams, which are transmitted from the terminal device 1320 to the terminal device 1380; and the C type packets are packets of storage requirements, which are transmitted from the external network 4000 to the terminal device 1310.

In an embodiment, if the controller 1160 would like to monitor one or more packets which pass through the switch 1220 and have a target addresses corresponding to the terminal device 1380, the controller 1160 transmits a traffic control instruction to the switch 1220 so that the switch 1220 schedules all the packets, the target addresses of which correspond to the terminal device 1380, in the monitoring list, and then schedules the packets in the operating list. Therefore, both the A type of packets and the B type of packets are monitored by the switch 1220 and the monitoring result is transmitted to the controller 1160.

In another embodiment, if the controller 1160 would like to monitor the packets, passing through the switch 1220 and having source addresses corresponding to the terminal device 1310, the controller 1160 transmits a traffic control instruction to the switch 1220 so that the switch 1220 schedules all the packets, of which the source addresses correspond to the terminal device 1310, in the monitoring list, and then schedules the packets in the operating list. Therefore, the A type of packets are monitored by the switch 1220 and the monitoring result is transmitted to the controller 1160.

In yet another embodiment, if the controller 1160 would like to monitor the packets, passing through the switch 1220 and having a service type of the video stream, the controller 1160 transmits a traffic control instruction to the switch 1220 so that the switch 1220 schedules all the packets for the video stream in the monitoring list, and schedules the packets in the operating list. Therefore, the B type of packets are monitored by the switch 1220 and the monitoring result is transmitted to the controller 1160.

According to the aforementioned embodiments, one or more types of packets among all packets passing through the switch 1220 are periodically monitored by scheduling such one or more packets in the monitoring list, and the traffic volume of the other types of packets is merely estimated by packet sampling. However, when the controller 1160 obtains the traffic data related to the monitored type of packets, the controller 1160 stores the traffic data in the database 1150 so that the traffic analyzer 1140 is able to estimate traffic volumes of the other types of packets, which are merely sampled but not monitored, according to the traffic data of the packets which are monitored and the total traffic volume of the packets which pass through the switch 1220. More concretely, in the embodiment as shown in FIG. 3, when the sampling interval is 4, the A type of packets account for a quarter of the packets which pass through the switch 1220, the B type of packets account for five-eighth of the packets which pass through the switch 1220, and the C type of packets account for one-eighth of the packets which pass through the switch 1220. When the traffic analyzer 1140, according to the traffic data related to the B type of packets and stored in the database 1150, determines that the traffic volume of the B type of packets accounts for 46.9% of the total traffic volume and the A type of packets and the C type of packets share the remaining traffic volume, which is 51% of the total traffic volume. Afterwards, the traffic analyzer 1140 estimated that the traffic volume of the A type of packets account for 35.4% of the total traffic volume and that of the C type of packets account for 17.7% of the total traffic volume according to the ratio (2:1) between the number of the A type of packets and that of the C type of packets in the sampled packet data. In thirty-two packets as shown in FIG. 3, there are eleven A type packets accounting for 34.375% of all the packets, fifteen B type packets accounting for 46.875% of all the packets and six C type packets accounting for 18.75% of all the packets. In other words, by the estimation in this embodiment, there is no need to monitor all types of the packets. By monitoring merely a part of all the types of packets and sampling all the packets in this embodiment, the ratio between the traffic volumes of all types of packets may be estimated so that the traffic volume of each type of packets may be estimated accordingly.

In an embodiment, when the controller 1160 selects the B type of packet for asking the switch to record the traffic volume of all the B type of packets in the beginning but the result of the aforementioned estimation indicates that the ratio for which the traffic volume of the A type of packets account is larger than the ratio for which the traffic volume of the B type of packets account, the controller 1160 selects the A type of packet instead of the B type of packets for asking the switch to record the traffic volume of all the A type of packets.

Figure 4A:
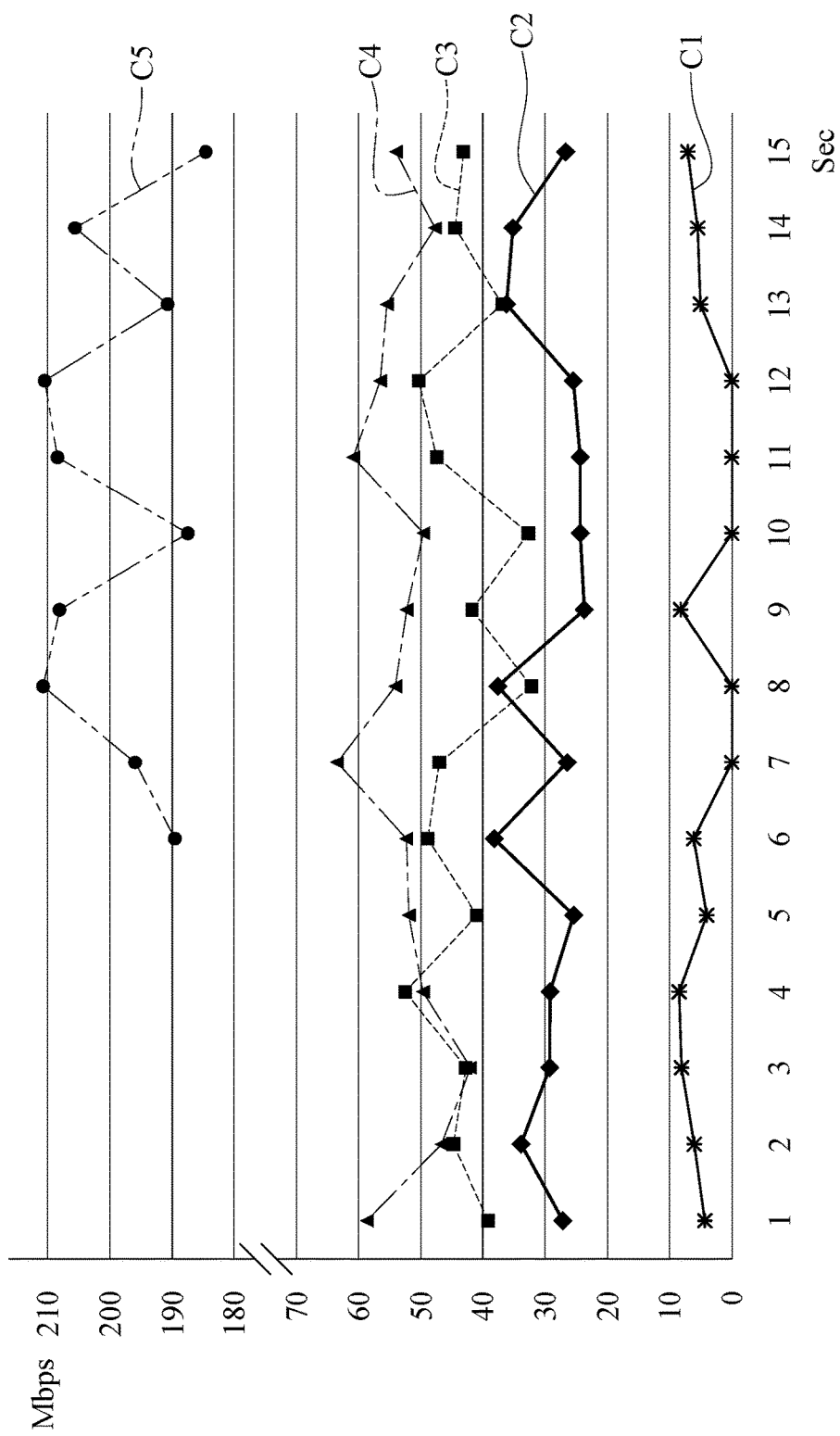
FIG. 4A is a timing diagram of estimation of traffic volumes by merely sampling technique.
Figure 4B:
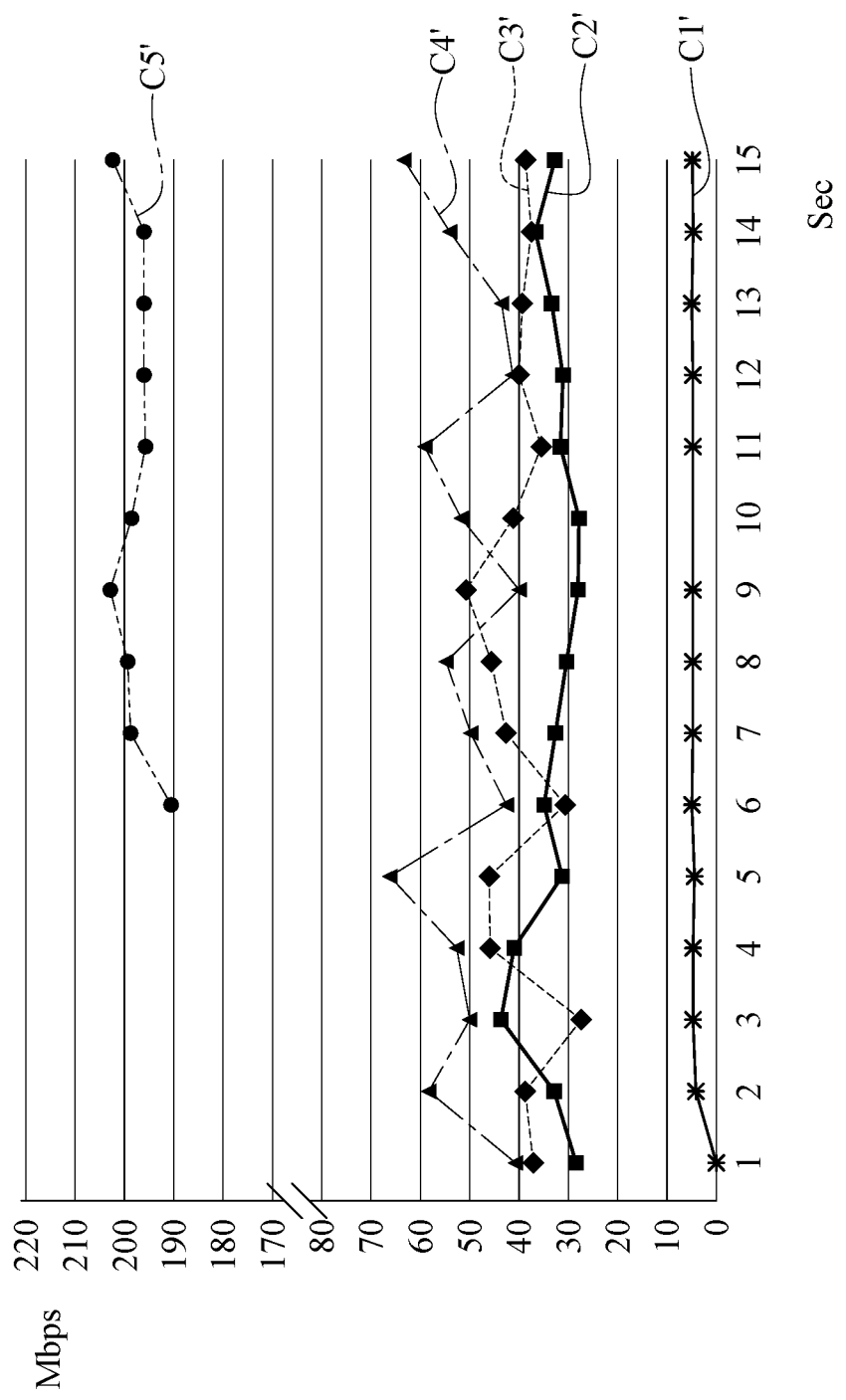
FIG. 4B is a timing diagram of estimation of traffic volumes by a method in an embodiment of this disclosure.

Please refer to FIG. 4A and FIG. 4B. FIG. 4A is a timing diagram of estimation of traffic volumes by merely sampling technique, and FIG. 4B is a timing diagram of estimation of traffic volumes by a method in an embodiment of this disclosure. In an experiment, five streams are used for building an experimental environment and the traffic volumes of the five streams are respectively 5 million bytes per second (Mbps), 30 Mbps, 40 Mbps, 50 Mbps and 200 Mbps. As shown in FIG. 4A, a curve C1 corresponds to the 5 Mbps stream, a curve C2 corresponds to the 30 Mbps stream, a curve C3 corresponds to the 40 Mbps stream, a curve C4 corresponds to the 50 Mbps stream, and a curve C5 corresponds to the 200 Mbps stream. As shown in FIG. 4B, a curve C1' corresponds to the 5 Mbps stream, a curve C2' corresponds to the 30 Mbps stream, a curve C3' corresponds to the 40 Mbps stream, a curve C4' corresponds to the 50 Mbps stream, and a curve C5' corresponds to the 200 Mbps stream. Moreover, the sampling interval in the embodiment as shown in FIG. 4A is 500, which means one in every five hundreds packets is selected during the sampling. In other words, the packets are sampled with a sampling rate of 0.2%. The sampling rate in the embodiment as shown in FIG. 4B is 0.05%, which means one in every two thousands packets is selected during the sampling. Furthermore, the operating method provided in one of the embodiments of this disclosure is used in the embodiment as shown in FIG. 4B. More concretely, as shown in FIG. 4B, the controller of the network traffic monitoring system selects the type of packets which respectively have the maximum traffic volume and the type of packets which have the minimum traffic volume for monitoring. In other words, the 200 Mbps stream and the 5 Mbps stream are monitored, and the traffic volumes of other streams are estimated by the aforementioned method. Generally, for the estimation which is executed by the sampling, the lower sampling rate results in the less resource consumption and the lower precision. However, as shown in FIG. 4A and FIG. 4B, the estimation based on in the method and structure in the embodiment of this disclosure may still have a considerable precision even if a low sampling rate is used. Moreover, the traffic volume of the target stream monitored in practice may be estimated precisely by the method in the embodiment of this disclosure.

Figure 5:
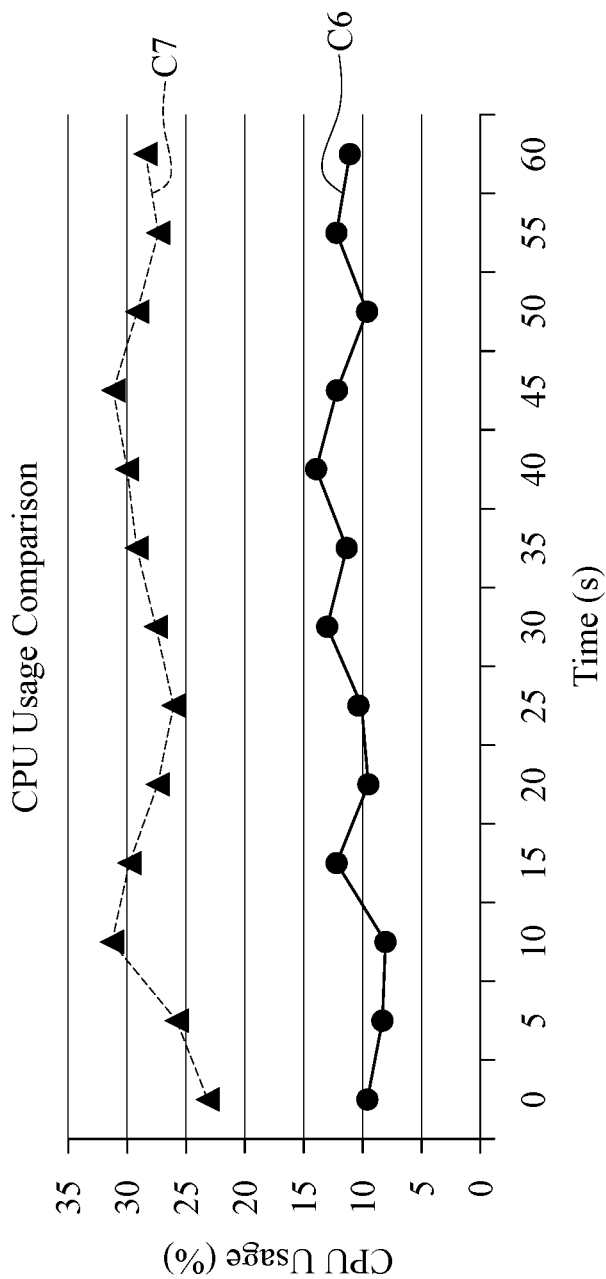
FIG. 5 is a schematic view exemplarily illustrating the comparison between the usage rates of central processing units (CPUs) under different conditions in another embodiment of this disclosure.

Please refer to FIG. 5, which is a schematic view exemplarily illustrating the comparison between the usage rates of central processing units (CPUs) under different conditions in another embodiment of this disclosure. As shown in FIG. 5, a curve C6 indicates the usage rate of the CPU during simple polling of the controller, and a curve C7 indicates the usage rate of the CPU when the CPU operates based on the method in the aforementioned embodiment. As shown in FIG. 5, the usage rate of the CPU during the execution of the method provided in the embodiment of this disclosure is lower than the usage rate of the CPU during the polling of the conventional controller. In an embodiment, the controller 1160 can further control the switch 1220 to adjust the sampling rate of the sampled packet data according to an operation rate (usage rate) of the processor. More concretely, in an embodiment, the controller 1160 can set an operation rate threshold of 40% and ask the switch 1220 to increase the packet sampling rate (reduce the sampling interval) when the operation rate of the processor is lower than 40%. Therefore, when the processor of the switch 1220 is not busy, the network traffic monitoring system 1100 may increase the packet sampling rate of the switch 1220, that is, to increase the precision of the traffic monitoring.

Figure 6A:
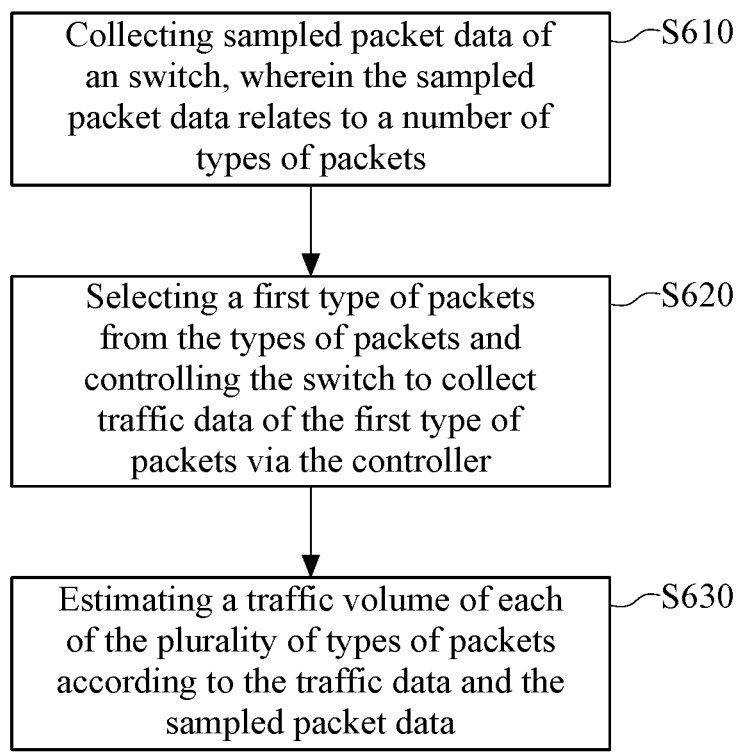
FIG. 6A is a flow chart of a method for monitoring network traffic in an embodiment of this disclosure.

In view of the above description, a method for monitoring network traffic in an embodiment of this disclosure is shown in FIG. 6A. FIG. 6A is a flow chart of a method for monitoring network traffic in an embodiment of this disclosure. The method is applied to a network traffic monitoring system including at least one processor and at least one memory and includes the following steps: in step S610, collecting sampled packet data of a switch, wherein the sampled packet data relates to a number of types of packets; in step S620, selecting a first type of packets from the types of packets and controlling the switch to collect traffic data of the first type of packets via the controller; and in step S630, estimating a traffic volume of each of the plurality of types of packets according to the traffic data and the sampled packet data.

Figure 6B:
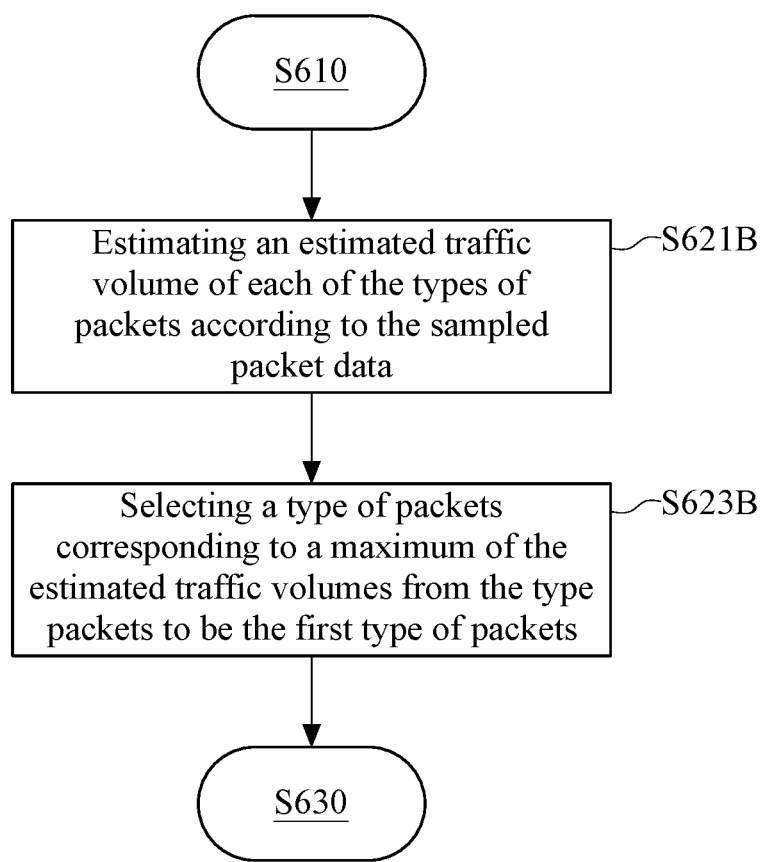
FIG. 6B is a flow chart corresponding to the step S620 of the method in FIG. 6A in an embodiment of this disclosure.

In an embodiment, please refer to FIG. 6B, which is a flow chart corresponding to the step S620 of the method in FIG. 6A in an embodiment of this disclosure. The step S620 includes the following steps: in step S621B, estimating an estimated traffic volume of each of the types of packets according to the sampled packet data; and in step S623B, selecting a type of packets corresponding to a maximum of the estimated traffic volumes from the type packets to be the first type of packets.

Figure 6C:
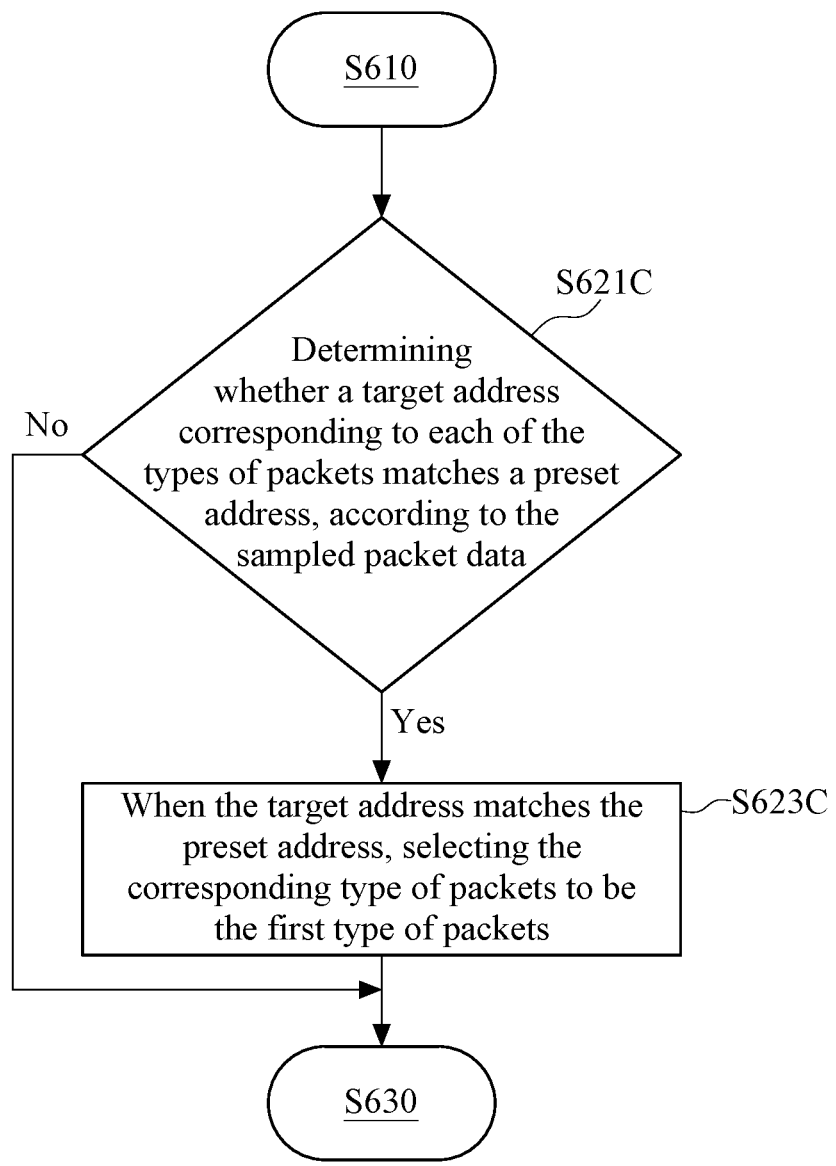
FIG. 6C is a flow chart corresponding to the step S620 of the method in FIG. 6A in an embodiment of this disclosure.

In an embodiment, please refer to FIG. 6C, which is a flow chart corresponding to the step S620 of the method in FIG. 6A in an embodiment of this disclosure. The step S620 includes the following steps: in step S621C, determining whether a target address corresponding to each of the types of packets matches a preset address, according to the sampled packet data; and in step S623C, when the target address matches the preset address, selecting the corresponding type of packets to be the first type of packets.

Figure 6D:
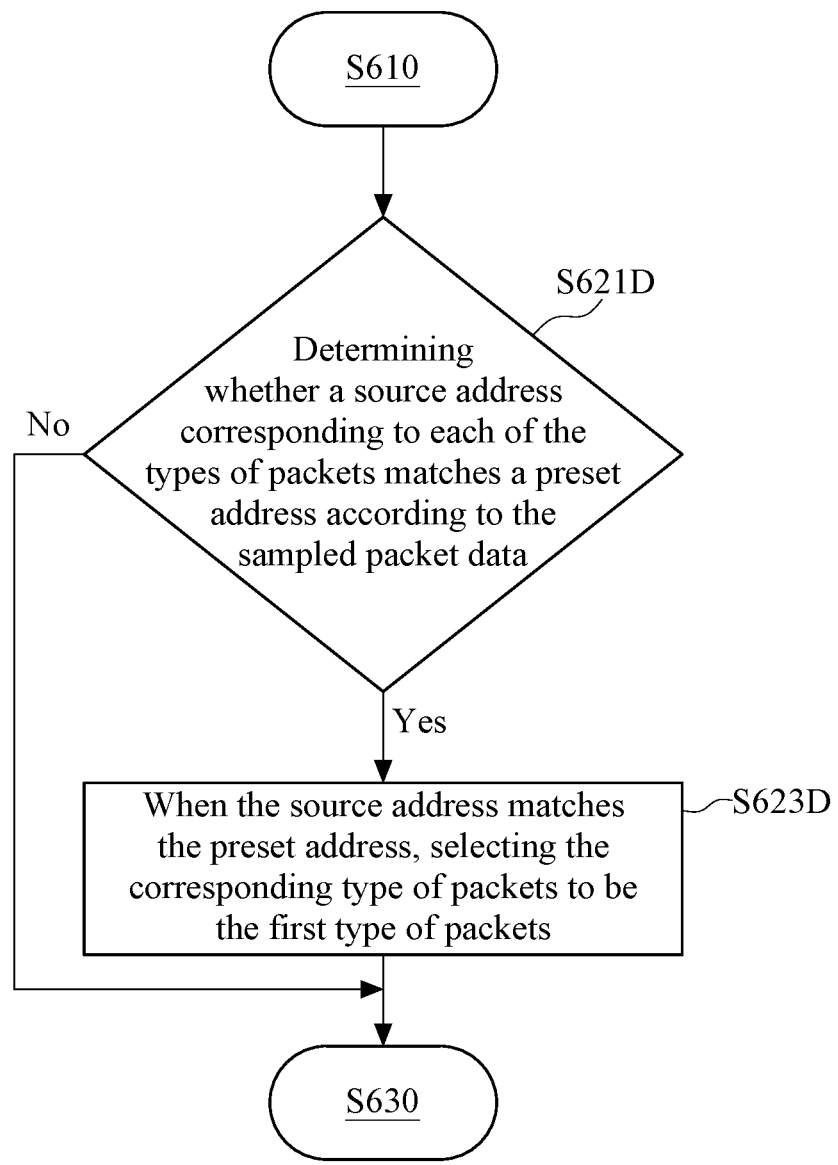
FIG. 6D is a flow chart corresponding to the step S620 of the method in FIG. 6A in an embodiment of this disclosure.

In an embodiment, please refer to FIG. 6D, which is a flow chart corresponding to the step S620 of the method in FIG. 6A in an embodiment of this disclosure. The step S620 includes the following steps: in step S621D, determining whether a source address corresponding to each of the types of packets matches a preset address according to the sampled packet data; and in step S623D, when the source address matches the preset address, selecting the corresponding type of packets to be the first type of packets.

Figure 6E:
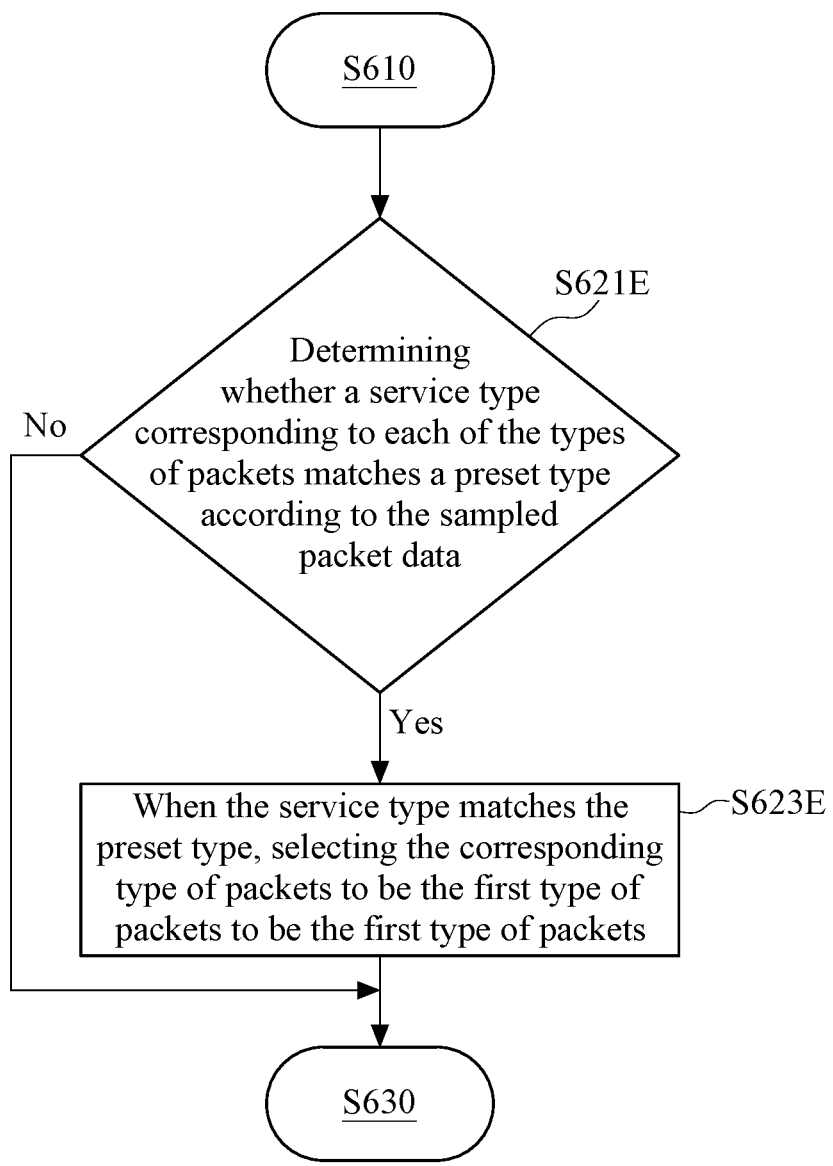
FIG. 6E is a flow chart corresponding to the step S620 of the method in FIG. 6A in an embodiment of this disclosure.

In an embodiment, please refer to FIG. 6E, which is a flow chart corresponding to the step S620 of the method in FIG. 6A in an embodiment of this disclosure. The step S620 includes the following steps: in step S621E, determining whether a service type corresponding to each of the types of packets matches a preset type according to the sampled packet data; and in step S623E, when the service type matches the preset type, selecting the corresponding type of packets to be the first type of packets to be the first type of packets.

Figure 7:
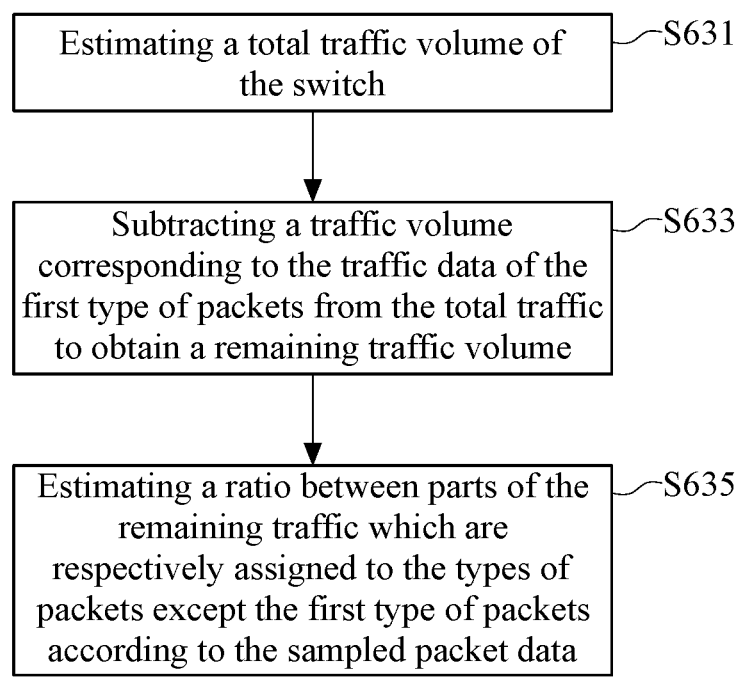
FIG. 7 is a flow chart corresponding to the step S630 of the method in FIG. 6A in an embodiment of this disclosure.

In an embodiment, please refer to FIG. 7, which is a flow chart corresponding to the step S630 of the method in FIG. 6A in an embodiment of this disclosure. The step S630 includes the following steps: in step S631, estimating a total traffic volume of the switch; in step S633, subtracting a traffic volume corresponding to the traffic data of the first type of packets from the total traffic to obtain a remaining traffic volume; in step S635, estimating a ratio between parts of the remaining traffic which are respectively assigned to the types of packets except the first type of packets according to the sampled packet data.

In view of the above statement, the network traffic monitoring system and the method thereof provided in the embodiments of this disclosure monitor the network traffic by the polling of the controller and the packet sampling simultaneously. Moreover, the monitoring system and the method thereof merely execute the controller polling to the target types of packets as executing the controller polling. As a result, compared with conventional controller polling, the loading of the switch is reduced.

What is claimed is:

1. A method for monitoring network traffic, applied to a network traffic monitoring system, and the method comprising:
    collecting sampled packet data of a switch into a database, wherein the sampled packet data relates to a plurality of types of packets of sampled flow data passing through the switch and being sampled;
    selecting a first type of packets from the plurality of types of packets according to at least one condition;
    transmitting a traffic control instruction to the switch to control the switch to provide a monitoring list and an operating list;
    controlling the switch to schedule a packet in the monitoring list for collecting a traffic volume of the packet and then schedule the packet in the operating list according to the traffic control instruction, when the packet belongs to the first type of packets;
    controlling the switch to directly schedule the packet to the operating list when the packet does not belong to the first type of packets; and
    estimating a traffic volume of each of the plurality of types of packets except the first type of packets according to the traffic volume of the first type of packets and the sampled packet data of the switch.

2. The method according to claim 1, wherein the selecting the first type of packets from the plurality of types of packets according to the at least one condition comprises:

determining an estimated traffic volume of each of the plurality of types of packets according to the sampled packet data; and selecting a type of packets corresponding to a maximum of the estimated traffic volumes from the plurality of type packets to be the first type of packets.

3. The method according to claim 2, further comprising determining whether to re-select the first type of packets according to the traffic volume of each of the plurality of types of packets.

4. The method according to claim 1, wherein the selecting the first type of packets from the plurality of types of packets according to the at least one condition comprises:

determining whether a target address corresponding to each of the plurality of types of packets matches a preset address, according to the sampled packet data; and selecting the type of packets corresponding to the target address to be the first type of packets, when the target address matches the preset address.

5. The method according to claim 1, wherein the selecting the first type of packets from the plurality of types of packets according to the at least one condition comprises:

determining whether a source address corresponding to each of the plurality of types of packets matches a preset address, according to the sampled packet data; and selecting the type of packets corresponding to the source address to be the first type of packets, when the source address matches the preset address.

6. The method according to claim 1, wherein the selecting the first type of packets from the plurality of types of packets according to the at least one condition comprises:

determining whether a service type corresponding to each of the plurality of types of packets matches a preset type, according to the sampled packet data; and selecting the type of packets corresponding to the service type to be the first type of packets, when the service type matches the preset type.

7. The method according to claim 1, wherein the estimating the traffic volume of each of the plurality of types of packets except the first type of packets according to the traffic volume and the sampled packet data of the switch comprises:

estimating a total traffic volume of the switch;

subtracting the traffic volume of the first type of packets from the total traffic volume to obtain a remaining traffic volume; and estimating a ratio between parts of the remaining traffic which are respectively assigned to the plurality of types of packets except the first type of packets according to the sampled packet data.

8. The method according to claim 1, further comprising controlling the switch to adjust a sampling rate related to the sampled packet data according to an operation rate of a processor of the switch.

9. A network traffic monitoring system, comprising:

a sampled data collecting module configured to collect sampled packet data of a switch into a database, wherein the sampled packet data relates to a plurality of types of packets of sampled flow data passing through the switch and being sampled;

a controller configured to select a first type of packets from the plurality of types of packets according to at least one condition, to transmit a traffic control instruction to the switch to control the switch to provide a monitoring list and an operation list, to control the switch to schedule a packet in the monitoring list for collecting a traffic volume of the packet and then schedule the packet in the operating list according to the traffic control instruction, when the packet belongs to the first type of packets and to control the switch to directly schedule the packet to the operating list when the packet does not belong to the first type of packets; and a traffic analyzer electrically connected to the controller and the sampled data collecting module, and configured to estimate a traffic volume of each of the plurality of types of packets according to the traffic volume and the sampled packet data.

10. The network traffic monitoring system according to claim 9, wherein the traffic analyzer is configured to determine an estimated traffic volume of each of the plurality of types of packets according to the sampled packet data, and when the controller selects the first type of packets according to the at least one condition, the controller selects a type of packets corresponding to a maximum of the estimated traffic volumes from the plurality of type packets to be the first type of packets.

11. The network traffic monitoring system according to claim 10, wherein the controller is further configured to determine whether to re-select the first type of packet according to the traffic volume of each of the plurality of types of packets.

12. The network traffic monitoring system according to claim 9, wherein when the controller selects the first type of packets according to the at least one condition, the controller determines whether a target address corresponding to each of the plurality of types of packets matches a preset address, according to the sampled packet data, and when the target address matches the preset address, the controller selects the type of packets, corresponding to the target address, to be the first type of packets.

13. The network traffic monitoring system according to claim 9, wherein when the controller selects the first type of packets according to the at least one condition, the controller determines whether a source address corresponding to each of the plurality of types of packets matches a preset address, according to the sampled packet data, and when the source address matches the preset address, the controller selects the type of packets, corresponding to the source address, to be the first type of packets.

14. The network traffic monitoring system according to claim 9, wherein when the controller selects the first type of packets according to the at least one condition, the controller determines whether a service type corresponding to each of the plurality of types of packets matches a preset type according to the sampled packet data, and when the service type matches the preset type, the controller selects the type of packets, corresponding to the preset type, to be the first type of packets.

15. The network traffic monitoring system according to claim 9, wherein when the traffic analyzer estimates the traffic volume of each of the plurality of types of packets except the first type of packets according to the traffic volume of the first type of packets and sampled packet data of switch, the traffic analyzer estimates a total traffic volume of the switch, subtracts the traffic volume of the first type of packets from the total traffic volume to obtain a remaining traffic volume, and estimates a ratio between parts of the remaining traffic which are respectively assigned to the plurality of types of packets except the first type of packets according to the sampled packet data.

16. The network traffic monitoring system according to claim 9, the controller is further configured to control the switch to adjust a sampling rate related to the sampled packet data according to an operation rate of a processor of the switch.

17. The network traffic monitoring system according to claim 9, wherein a traffic monitor comprises the sampled data collecting module and the traffic analyzer and the database.

* * * * *